June 23, 1970 N. L. WILLMANN 3,516,864
BATTERY GRID AND TERMINAL THEREFOR
Filed Nov. 20, 1967 2 Sheets-Sheet 1
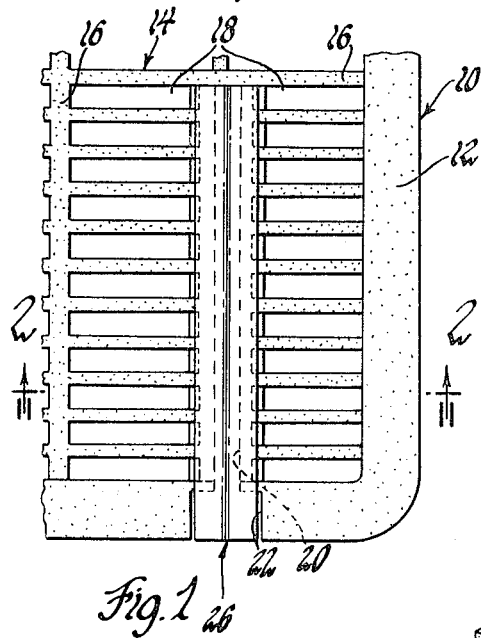
Fig. 1
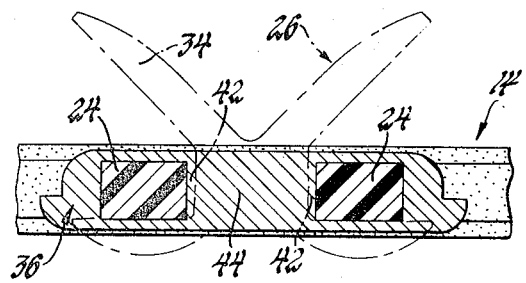
Fig. 2
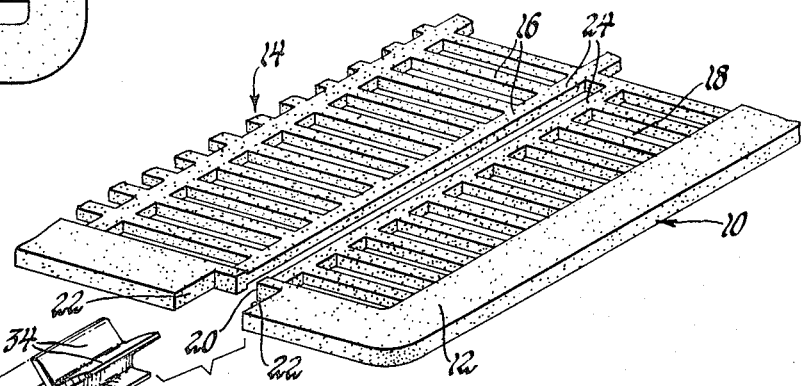
Fig. 3
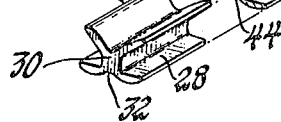
Fig. 6
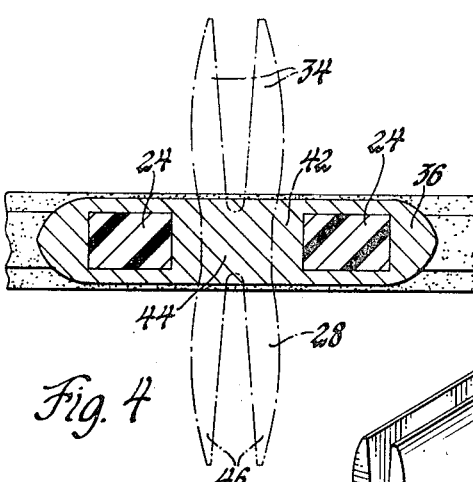
Fig. 4
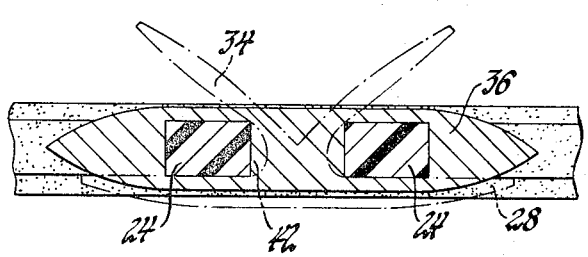
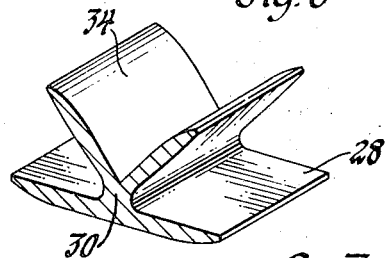
Fig. 5
Fig. 7
INVENTORS.
Norman L. Willmann &
BY Ellis G. Wheadon
R. J. Wallace
ATTORNEY

United States Patent Office 3,516,864
Patented June 23, 1970

3,516,864
BATTERY GRID AND TERMINAL THEREFOR
Norman L. Willmann, Anderson, and Ellis G. Wheadon, Yorktown, Ind., assignors to General Motors Corporation, Detroit, Mich., a corporation of Delaware
Filed Nov. 20, 1967, Ser. No. 684,151
Int. Cl. H01m 35/04
U.S. Cl. 136—58
8 Claims

ABSTRACT OF THE DISCLOSURE

A nonconductive battery grid and terminal therefor, which grid includes an elongated slot for receiving and retaining the terminal. The terminal is comprised of a deformable, preferably fusible, material and has a base portion and an interlocking portion. The interlocking portion extends into and through the slot and is deformed into interlocking engagement with the boundaries of the slot. The terminal is preferably fused to itself. The grid is preferably coated with a conducted material, e.g., lead. Various terminals are disclosed which have interlocking portions which include bifurcated members, bifurcated and flared members, sectioned members with alternately deformable leaves, and elongated rivet-like members.

---

Figure 8:
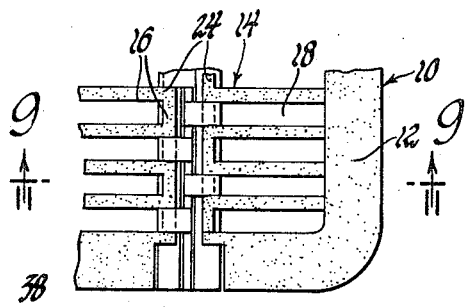

This invention relates to storage battery components and more particularly to battery plates and their manufacture. The invention is most particularly applicable to lead-acid storage batteries.

In the development of storage batteries, it has been recognized that it would be desirable to form battery plate grids for the negative and positive plate components, at least in part, of a low cost, light weight material rather than lead or the like. Hence, in the past, various approaches have been proposed such as using gauze material, fiberglass, polystyrene foam, asbestos, and other core structures which may be covered by a metallic coating to form battery plate grids. A problem associated with these grids is that of providing terminals therefor, which terminals provide good electrical connection between the terminal and the active material of the plate, as well as a sound mechanical connection between the grid and the terminal. In addition to providing the requisite electrical and mechanical connections, the joint between the terminal and the grid should be susceptible of easy fabrication on a production line basis. Terminals, such as disclosed in Helms 3,269,863 effectively satisfy the first two requirements but requires a separate milling operation to form the lug receiving groove and close tolerances and demanding production controls to insure that the terminal is properly rgeistered and perfectly mated with the grid. The incident invention eliminates the milling step and simplifies the assembly operation in addition to providing the requisite electrical and mechanical connection. It is therefore an object of this invention to simplify the step of joining a conductive terminal to a grid by substantially reducing the requirement for rigid process controls with respect to alignment and placement of parts. A further object of the invention is to provide an increased surface area of contact between the terminal and the active material of the plate while at the same time provide an improved mechanical connection between the terminal and the grid. These and other objects and advantages will become apparent from the description which follows.

Briefly described, the incident invention is a unique battery plate grid and terminal lug therefor which provides an improved electrical contact with the active material, a strong joint between the terminal and the grid and a simple, yet effective, means for assembling the respective parts. The novel, nonconductive battery plate grid and conductive terminal therefor of this invention encompasses a grid which has an elongated slot formed therein for receiving and retaining the terminal. The terminal is an elongated conductive member formed from a deformable electrically conductive material and having a base portion and an interlocking portion. The terminal can be inserted from the end of the slot, as by a sliding action, or upwardly from beneath it. The base portion underlies the grid at the slot boundaries and the interlocking portion extends through the slot and is deformed about the slot boundaries so as to be in locking engagement with the slot. In addition to deforming the terminal member, it is preferred to also fuse it to itself along its length to further enhance the mechanical bond between the terminal and the grid. In the preferred embodiment the terminal is deformed sufficiently to permit flush pasting of the grid with respect to the grid borders which are thicker than the grid body. Preferably, the body of the grid is itself thinner than the border and has a plurality of openings therein. The grid can conveniently be made by punching and coining plastic sheet stock to the desired dimensions. The grid is preferably comprised of a high-strength, non-porous, acid resistant, molded plastic material such as polyethylene, polyvinylchloride, polysytrene or polypropylene with the latter being preferred.

Figure 9:
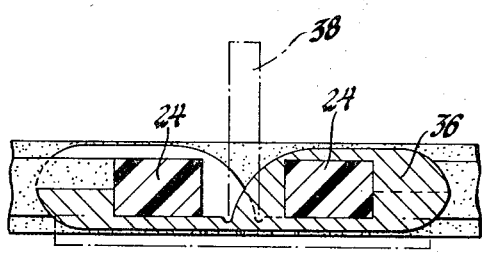
Figure 10:
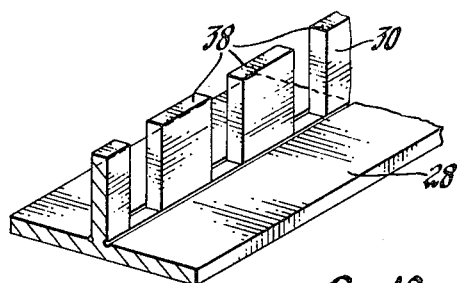
Figure 11:
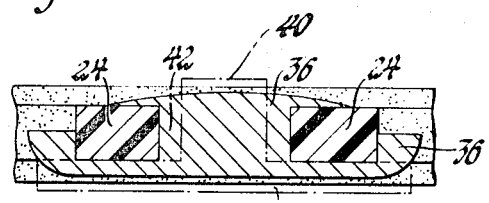
Figure 12:
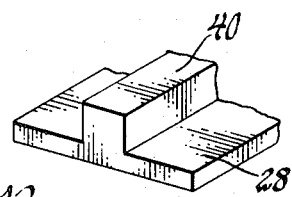
Figure 13:
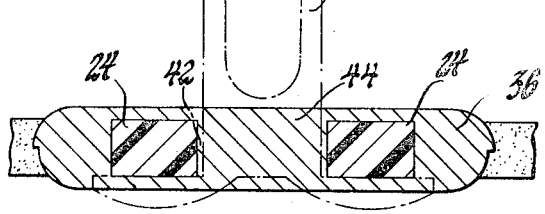
Figure 15:
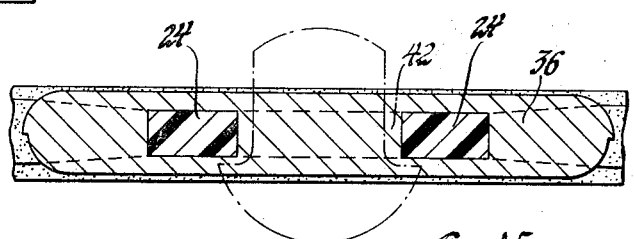
Figure 14:
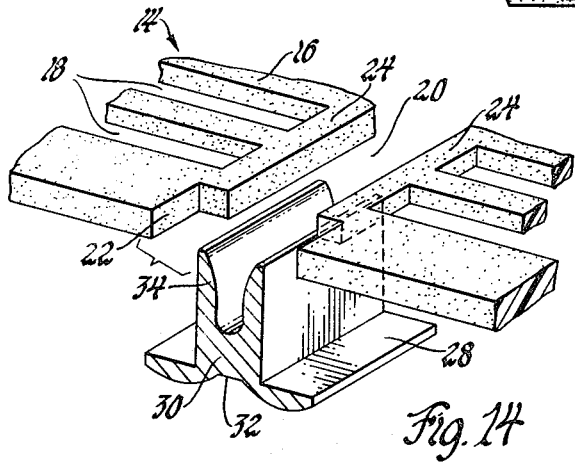
Figure 16:
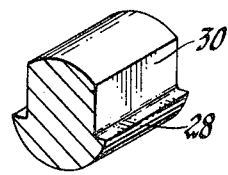

FIG. 1 is a partial plan view of a grid and terminal according to this invention.
FIG. 2 is a sectioned end view of the grid and terminal shown in FIG. 1.
FIG. 3 is a perspective view of the grid and terminal of FIG. 1 as they existed before they were mated.
FIG. 4 is a sectioned end view of the slot shown in FIGS. 3 and 14 when used in conjunction with the terminal embodiment shown in FIG. 5.
FIG. 5 is a perspective view of another embodiment of this invention.
FIG. 6 is a sectioned end view of the slot shown in FIGS. 3 and 14 when used in conjunction with the terminal shown in FIG. 7.
FIG. 7 is a perspective view of another embodiment of this invention.
FIG. 8 is a partial plan view of another grid and terminal according to this invention.
FIG. 9 is a sectioned end view of the grid and terminal shown in FIG. 8.
FIG. 10 is a perspective view of the terminal shown in FIGS. 8 and 9.
FIG. 11 is a sectioned end view of the slot shown in FIGS. 3 and 14 when used in conjunction with the terminal embodiment shown in FIG. 12.
FIG. 12 is a perspective view of another embodiment of this invention.
FIG. 13 is a sectioned end view of the slot shown in FIGS. 3 and 14 when used in conjunction with the terminal shown in FIG. 14.
FIG. 14 is a perspective view of a grid and terminal of FIG. 13 as they existed before they were assembled.
FIG. 15 shows a sectioned end view of the grid slot shown in FIGS. 3 and 14 when in conjunction with the terminal shown in FIG. 16.
FIG. 16 is a perspective view of another embodiment of this invention.

Though the following discussion will be primarily in terms of the formation of negative plate structures for use in automobile-type lead acid storage batteries, it is to be understood that the principles involved are also applicable to positive plate structures and other battery systems.

Referring to FIGS. 1, 2 and 3, a preferred battery plate grid 10 is comprised principally of a grid border 12 and a grid body 14. The grid body 14 is preferably recessed within the border 12, and has a plurality of openings 18 therein. Recessing of the grid body within the border may be accomplished by compressing or coining the solid portion, or grid wires 16, of the grid body 14 at the same time that the openings 18 are punched in the sheet or in a separate operation. Grid wires 16, or the like, form the solid portion of the grid body 14, and in addition to giving the grid strength, serve as the framework over and about which the active material is placed. A slot 20 is formed in the border 12 and the grid body 14. This is preferably accomplished during the grid body punching operation. The slot 20 is defined by border boundaries 22 and body boundaries 24. The grid body boundaries 24 are, in effect, two closely-spaced substantially parallel grid wires, such as 16. As best shown in FIG. 3, a terminal member 26 has a base portion 28, which underlies the grid 10, and an interlocking portion 30 which is adapted for insertion into slot 20 of grid 10. In this particular embodiment, the interlocking portion 30 is bifurcated such as to produce two outwardly flared branches 34. Owing to the outward flare of the branches 34, this terminal must be inserted lengthwise into the slot 20 from the border end of the slot. After insertion, the terminal is deformed as by rolling, pressing, staking or the like, and combinations thereof, so as to cause the material of the terminal to interlock with, by flowing about, the boundaries 24 of the slot 20. It is preferred to heat the terminal during deformation to enhance the flowability of the material and to fuse it to itself after it has engulfed the slot boundaries 24. An indentation 32 is provided in the base portion 28 to provide a space for excess metal flow during the deformation step if required. FIG. 2 shows the terminal after it has been deformed into interlocking engagement with and fused about the grid body boundaries 24. The product of the deformation is generally designated as 36 while the original form of the terminal 26 is shown in phantom. The dimensions of the slot 20 and the interlocking member 30 are such as to provide a space 42 between the side walls of the core 44 of the interlocking member 30 and the slot boundaries 24. This provides a "loose fit." This "loose fit" between the mating members substantially reduces the requirement for extremely rigid processing controls with respect to the indexing and registering steps of the assembly operation. Hence, tolerances on the production equipment need not be as crucial as heretofore necessary. Sufficient metal is provided in the terminal member to fill the space 42 with metal flow when the terminal is deformed. The particular product of deformation 36 is indicative of a specific type of die or tool used to deform the terminal 26. Clearly, any of a variety of tools might be employed, each leaving its own distinctive deformation product. Generally, the tool should be such as to fold the branches 34 or portions thereof down and around the boundaries 24 while at the same time squash the base 28 and core 44 such that the metal therein will flow around the boundaries 24 and fill the void 42. A heated tool is preferably used. The terminals may also be attached to the grid by other techniques, such as staking, crimping, etc. The important thing is that a secure interlock be effected between the terminal 26 and the slot boundaries 24.

FIGS. 6 and 7 show a variation of the terminal structure shown in FIGS. 2 and 3 wherein the base 28 is generally thinner and hence requires less material. When using this embodiment the slot 20 is generally narrower and the space 42 reduced. The embodiment shown in FIGS. 6 and 7 does not include a core 44. This contributes to the lessening of the amount of lead required and, hence, the cost of the terminal.

FIGS. 4 and 5 show another embodiment of the invention. In this embodiment, the base 28 is the substantial mirror image of the upper most segment of the interlocking portion 30, in that it too is forklike and has branches 46. During assembly, the branches 46 are folded under the slot boundaries 24 in the same manner as the branches 34 of the interlocking member 30 are folded over the slot boundaries. This particular embodiment can be inserted lengthwise or upwardly into the slot.

FIGS. 8, 9 and 10 show another embodiment of the invention. In this embodiment, the interlocking portion 30 of the terminal is an upstanding member which has been sectioned into a plurality of spaced leaves 38. As best shown in FIGS. 8 and 9, the leaves are alternately folded over and around the slot boundaries 24 during the deformation process. Like the embodiment shown in FIGS. 6 and 7, this embodiment permits the use of a lesser amount of lead and a narrower slot. Narrowing the slot also increases the strength of the grid.

FIGS. 11 and 12 show another embodiment of the invention. Herein, the interlocking member comprises an upstanding rib or terrace 40 which rises above the base 28. The rib 40 is deformed much like a rivet and thereby engages the slot boundary 24 in a manner best depicted in FIG. 11. As in the other embodiments, the deformation step causes the base 28 to flow about the lower portion of the slot boundaries 24.

FIGS. 13 and 14 show another embodiment of the invention. This embodiment is similar to that shown in FIG. 3, except that the branches 34 do not flare outwardly. The FIG. 13 embodiment, like that shown in FIGS. 10, 12 and 16, may be inserted into the slot 20 from beneath the grid such as is shown in FIG. 14.

The embodiment shown in FIGS. 15 and 16 are similar to that shown in FIGS. 11 and 12. This particular embodiment is most easily extruded into long lengths which can be cut to the desired lengths. One particular choice of dies will deform the FIG. 16 embodiment into the product of deformation 36 shown in FIG. 15.

In addition to forming a strong interlocking joint between the grid, the terminals disclosed and claimed herein provide increased surface areas for contact with the active material of the plate with the result that the IR loss of the plate is reduced. As will be discussed hereafter, a further reduction of the IR loss may be had by providing a coating (not shown) on the grid. Another distinct advantage to the terminals of the instant invention resides in their ability to be mass-produced in a rapid, uncomplicated, inexpensive way. In this connection, it is preferred to extrude continuous lengths of the terminal, and subsequently cut same into the desired terminal lengths. This avoids the complicated and costly casting and punching techniques used heretofore. Clearly, however, these other techniques may be used if it is desired to do so.

When using an active material which has a high resistivity, the plastic grid is preferably coated with a conductive layer of material, such as lead, for forming a conductive surface on the grid. This is done to enhance current flow to the terminal. Any acceptable technique for applying the conductive coating may be used. However, it is preferred to use a technique in which the plastic grid is first roughened, as by blasting with a suitable abrasive material such as 100 mesh $Al_2O_3$, and subsequently metallized. Roughening of the plastic surface tends to increase the adherence of the conductive coating to the grid. It is preferred to metallize by flame spraying the grid to a predetermined thickness of at least about 0.003 inch, with a 0.006 inch thickness being preferred. The terminal may be mated with the grid slot either before or after the metallizing step. If the grid is metallized before the terminal is affixed thereto, an even greater surface area of electrical contact is provided. On the other hand, the deformation step tends to produce discontinuities in the conductive coating, which effectively increases its resistance and hence somewhat impedes its intended function. Therefore, when metallizing before mating, the joining and deformation steps require more care to protect the metallized surface. In the alternative, the grid can be metallized after the terminal has been interlocked with the grid. In this case, the layer of lead is formed atop the terminal and the grid. In either case, a large area of contact between the terminal and the grid coating is provided which effectively extends the ability of the terminal to contact the active material which in turn reduces the IR loss of the plate itself. While flame spraying is the preferred process for metallizing the grid, othr processes may also be used, such as vacuum-metallizing, electroplating, and the like.

After the terminal and grid are assembled and appropriately metallized, the assembly moves to a pasting station where a suitable active material is placed in the openings and atop the grid body to a desired thickness. Preferably, the grid body has a thickness less than the border and the paste is applied so as to be flush with the grid border. The preferred overall thickness of such a flush pasted plate is about 0.060 inch. The thickness of the grid body is approximately 0.040 inch. The terminal is preferably flattened to a thickness of somewhere between the thickness of the grid body (0.040") and the grid border (0.060"). Clearly, however, the entire grid may be overpasted without departing from the novel features of this invention. In this latter case, in addition to completely burying the terminal and grid body, the paste would also cover the grid border. Usually, an overpasted condition of about 0.01 inch is preferred.

When using active materials which have a relatively low inherent IR drop, such as disclosed in copending application U.S. Ser. No. 634,990, now Patent No. 3,466,193 entitled "Storage Battery Positive Plate," filed May 1, 1967 in the name of Thomas J. Hughel, and assigned to the assignee of the instant invention, the aforementioned conductive coating may be eliminated as a means for increasing the overall conductivity of the plate.

It is to be understood that although this invention has been described in connection with certain specific embodiments thereof, no limitation is intended thereby, except as defined in the appended claims.

We claim:

1. In a battery plate structure the combination of a nonconductive grid supporting the active material of said battery plate and a conductive terminal connected to said grid providing electrical contact with said active material, said grid comprising a border and a grid body, said grid body having a plurality of openings therein and situated within said border, the improvement comprising said grid having an elongated open slot therein receiving and retaining said terminal, which slot has boundaries formed by elements of said body, and said conductive terminal comprising a deformable material and having a first portion and a second interlocking portion, wherein said first portion underlies said grid at said slot and said second interlocking portion extends from said first portion through said slot, said second interlocking portion being deformed into interlocking engagement with the boundaries of said slot.

2. In a battery plate structure the combination of a nonconductive grid suporting the active material of said battery plate and a conductive terminal connected to said grid providing electrical contact with said active material, said grid comprising a border and a grid body, said grid body comprising a plurality of grid wires situated within said border, the improvement comprising said grid having an elongated open slot therein for receiving and retaining said terminal, which slot has boundaries comprising two closely spaced substantially parallel grid wires which wires extend from said grid border into said grid body, and said conductive terminal comprising a deformable material and having a first portion and a second interlocking portion, wherein said first portion underlies said grid at said slot and said second interlocking portion extends from said first portion through said slot, said second interlocking portion being deformed into interlocking engagement with the boundaries of said slot.

3. In a battery plate structure the combination of a nonconductive grid supporting the active material of said battery plate and a conductive terminal connected to said grid providing electrical contact with said active material, said grid comprising a border and a grid body, said grid body having a plurality of openings therein and situated within said border, the improvement comprising said grid having an elongated open slot therein receiving and retaining said terminal, which slot has boundaries formed by elements of said body, and said conductive terminal comprising a deformable material and having a first portion and a second interlocking portion, wherein said first portion underlies said grid at said slot and wherein said second interlocking portion is an elongated bifurcated member which extends along the length of said first portion and projects from said first portion through said slot, said interlocking portion being deformed into interlocking engagement with the boundaries of said slot.

4. The battery plate structure as claimed in claim 3 wherein said bifurcated member has two outwardly flaring branches.

5. The battery plate structure as claimed in claim 3 wherein said first portion before deformation is the substantial mirror image of said interlocking portion.

6. In a battery plate structure the combination of a nonconductive grid supporting the active material of said battery plate and a conductive terminal connected to said grid providing electrical contact with said active material, said grid comprising a border and a grid body, said grid body having a plurality of openings therein and situated within said border, the improvement comprising said grid having an elongated open slot therein receiving and retaining said terminal, which slot has boundaries formed by elements of said body, and said conductive terminal comprising a deformable material and having a first portion and a second interlocking portion, wherein said first portion underlies said grid at said slot and said second interlocking portion is a sectioned member which forms a plurality of leaves jutting from said first portion through said slot, said leaves being deformed into interlocking engagement with the boundaries of said slot.

7. The battery plate structure as claimed in claim 6 wherein said leaves are alternately deformed in opposite directions interlockingly engaging said slot boundaries.

8. In a battery plate structure the combination of a nonconductive grid supporting the active material of said battery plate and a conductive terminal connected to said grid to provide electrical contact with said active material, said grid comprising a border and a grid body, said grid body having a plurality of openings therein and situated within said border, the improvement comprising said grid having an elongated open slot therein receiving and retaining said terminal, which slot has boundaries formed by elements of said body, and said conductive terminal comprising a deformable material and having a first portion and a second interlocking portion, wherein said first portion underlies said grid at said slot and said second interlocking portion being an elongated terraced element which extends along the length of said first portion and projects from said first portion through said slot, said terraced element being deformed into interlocking engagement with the boundaries of said slot.

References Cited

UNITED STATES PATENTS 2,694,100  11/1954  Zahn _____ 136—58
3,269,863   8/1966  Helms _____ 136—36

WINSTON A. DOUGLAS, Primary Examiner

A. SKAPARS, Assistant Examiner

U.S. Cl. X.R.

29—2; 136—36